United States Patent [19]

Staley

[11] 3,769,578

[45] Oct. 30, 1973

[54] GUARD ELECTRODE APPARATUS FOR BOOM OF INSULATED AERIAL DEVICE

[75] Inventor: Jerry A. Staley, Centralia, Mo.

[73] Assignee: A. B. Chance Company, Centralia, Mo.

[22] Filed: Apr. 13, 1972

[21] Appl. No.: 243,559

[52] U.S. Cl. .............................. 324/54, 174/5 SG
[51] Int. Cl. ...................... G01r 31/02, G01r 31/12
[58] Field of Search .............................. 324/54, 72; 174/5 SG, 11 BH

[56] References Cited
UNITED STATES PATENTS

| | | | |
|---|---|---|---|
| 3,320,524 | 5/1967 | Miller | 324/54 |
| 3,054,049 | 9/1962 | Chance | 324/54 |
| 2,170,813 | 8/1939 | Doble et al. | 324/54 |
| 3,449,668 | 6/1969 | Blackwell et al. | 324/72 |
| 3,612,994 | 10/1971 | Hooper | 324/54 |

Primary Examiner—Gerard R. Strecker
Attorney—Schmidt, Johnson, Hovey & Williams

[57] ABSTRACT

Apparatus for measuring leakage current passing through the insulative section of the boom of an aerial device for lifting workmen to an elevated height wherein is provided a conductive element on the outer surface of the insulative section for collecting leakage current passing therethrough, and a grounded conductive shield disposed in electrically insulated, overlying relationship to the conductive element to prevent extraneous ambient electrical currents from reaching the conductive element and being measured.

7 Claims, 4 Drawing Figures

PATENTED OCT 30 1973 3,769,578
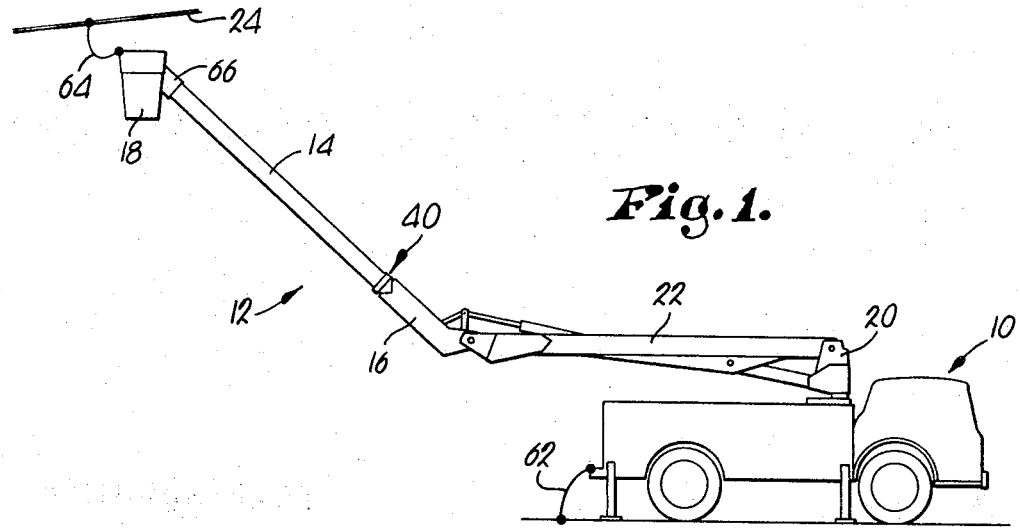
Fig.1.
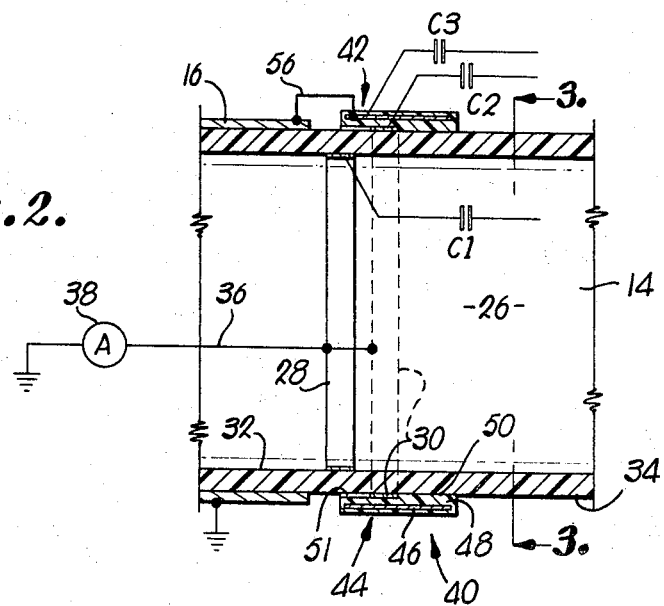
Fig.2.
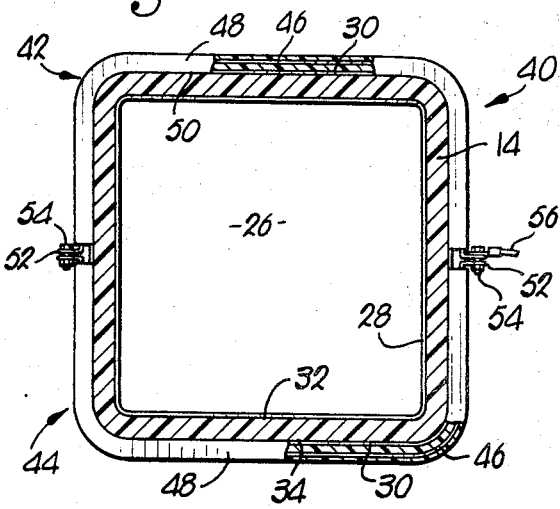
Fig.3.
Fig.4.

GUARD ELECTRODE APPARATUS FOR BOOM OF INSULATED AERIAL DEVICE

This invention relates to aerial devices and particularly those of the articulated type, wherein one of the boom members has an insulated section. More specifically, the invention pertains to means for measuring leakage current passing through the insulative section of the boom member.

An articulated aerial device of the class described usually incorporates an insulative section in one of the boom members in order to electrically insulate the working station at the upper end of the boom from the vehicle upon which the aerial device is mounted. The insulative section permits the working station to be brought near high voltage power lines or the like while maintaining maximum safety for workmen. This is especially required for live-line bare-hand work. It is important that the insulative characteristics of the boom be frequently monitored to assure that contamination or other conditions have not formed a conductive path along the boom sufficient to present a dangerous electrical discharge path from the working station to the vehicle.

Various methods of detecting leakage current through the insulative section of the aerial boom have been devised, and the most reliable indication of the insulative condition of the boom is determined by placing a leakage current pickup conductor near the lower end of the insulative portion of the boom and measuring the current collected thereby. The current measured through the pickup conductor band is independent of the normal working position of the aerial device or vehicle. The pickup band does, however, collect substantial extraneous electrical currents from the ambient atmosphere generated by overhead power line or other sources. These extraneous currents will normally constitute a substantial portion of the current collected and measured in view of the very small mangitude of current which leaks through the insulative section, and such ambient electrical currents may vary substantially in value with changes in humidity and other atmospheric conditions. The resulting insensitivity to the actual current leakage through the insulative section of the boom makes it particularly difficult to detect any changes in the insulative integrity of the boom, since the boom may be in a different locale and thereby subjected to differing wheather conditions between readings of the current leakage. While the monitoring of current leakage may be performed under laboratory conditions wherein the external environmental factors may be controlled, it is important for safety reasons that the boom be tested under actual working conditions where extraneous ambient electrical currents may well give rise to false readings and prevent determination of the actual electrical conditions of the boom, and make it particularly difficult to determine any significant changes in the insulative condition of the boom.

It is a broad object of the present invention to provide guard electrode apparatus for collecting extraneous ambient electrical currents to prevent the latter from reaching the conductive element which collects leakage current passing through an insulative section of an aerial boom such as those of the articulated type so that the insulative integrity of the boom may be reliably measured.

It is another object of the invention to provide apparatus for monitoring current leakage through the insulative boom which includes a conductive element on the outer surface of the insulative section of the boom to collect leakage current passing therethrough, detecting means for measuring current collected by the conductive element, and guard means for collecting extraneous ambient electrical currents to prevent the latter from reaching the conductive element so that said apparatus measures substantially only the boom leakage current.

Another object of the invention is to provide a conductive element which extends transversely around the outer surface of the boom to collect a great portion of the current leaking therethrough, and a guard conductor surrounding the band and extending past the opposed side margins thereof and electrically insulated therefrom in order to effectively collect extraneous ambient electrical currents and prevent the latter from reaching the conductive band so that the magnitude of current collected by the band is a sensitive indicator of the current leakage through an insulated aerial boom.

These and other objects and advantages of the present invention are specifically set forth in or will become apparent from the following detailed description of a preferred embodiment of the invention when read in conjunction with the accompanying drawing, wherein:

FIG. 1 is a side elevation of an insulated aerial device mounted upon a vehicle set up in testing condition to monitor current leakage through the insulative boom;

FIG. 2 is an enlarged, partial longitudinal cross-sectional view of the insulative section of the boom and guard electrode apparatus as contemplated by the present invention with the leakage monitoring circuitry shown schematically;

FIG. 3 is a transverse cross-sectional view taken along lines 3—3 of FIG. 2 with portions broken away to reveal details of construction; and FIG. 4 is a side plan view of guard electrode apparatus of the present invention.

FIG. 1 depicts a utility vehicle 10 upon which is mounted an articulated aerial device generally referred to by the numeral 12, which has an upper boom section 14 composed of electrically insulative material such as glass reinforced plastic. The lower end of insulative boom section 14 is affixed within metallic boot 16, and at the upper end of section 14 there is provided a working station which may include one or more workman baskets 18. The aerial device 12 is pivotal upon its turret base 20, and the lower boom section 22, insulative section 14 and the basket 18 are individually adjustable by hydraulic actuators in order that the upper end of the boom may be located as desired, such as adjacent an overhead high voltage power line 24. The insulative section 14 is of hollow, rectangular cross section presenting an internal space 26 for carrying electrically insulated hydraulic conduits, control linkage or other appurtenances from the lower boom section 22 to the upper end of insulative section 14.

Conductive elements in the form of thin bands 28 and 30 of metallic, electrically conductive foil, respectively, extend transversely around in engagement with the inner and outer surfaces 32 and 34 of the insulative section of the boom. Conductive bands 28 and 30 are located at the lower end of insulative section 14 in adjacent relationship to the conductive boot 16 of the aerial device, and are slightly offset longitudinally relative to one another. The conductive bands are electrically interconnected by shielded conductor cable 36 with current detecting means in the form of a microammeter 38 that is positioned on the vehicle at a convenient and accessible location. The shielded cable or cables 36 extend from the vehicle proper through the internal boom space 26 up to the conductive bands and extends transversely through the insulative boom section 14 for interconnection with the outer conductive band 30.

Guard means 40 extend transversely around and are removably secured at the outer surface 34 of the insulative section in surrounding, covering relationship to the outer conductive band 30. The guard means is defined by half sections 42 and 44, each of which includes an intermediate, generally U-shaped metallic band or guard conductor 46 which is encapsulated in a U-shaped, outer member 48 of a weather-resistant, insulative synthetic resin material and thereby presenting a layer of insulation between boom section 14 and the innermost surfaces of respective metallic bands 46. As apparent from FIG. 3, the ends 52 of metallic band 46 project outwardly from opposed end stretches of member 48 and are bent outwardly at right angles to respective main legs thereof to facilitate interconnection of opposed sections 42 and 44. The ends 52 of sections 42 and 44 have suitable openings therein for receiving machine screws 54 or the like that releasably, mechanically and electrically interconnect the adjacent exposed ends of the guard conductors 46 associated with each half section. A conductive wire 56 electrically interconnects the guard conductor 46 with boot 16 which, in turn, is electrically interconnected with the body of vehicle 10. The inner surface 50 of each member 48 is provided with an inwardly facing notch 51 therein receiving a conductive band 30 and of a greater width than the latter. In this manner, sections 42 and 44 are maintained out of contacting relationship with band 30.

Guard conductor 46 is substantially wider than outer conductive band 30 and extends past the opposed side margins 58 of the latter. The guard means 40 thereby surrounds and substantially encloses the outer conductive band 30 without contacting the latter, it being noted that the exposed proximal stretches 52 of the guard conductors of half sections 42 and 44 are located quite close, leaving only sufficient gap for tolerance adjustment to assure a tight fit of guard means 40 on the boom, so that the outer conductive band is substantially completely isolated from the surrounding atmosphere.

Tests have shown that the plastic encapsulate member 48 should be of dimensions presenting an inner segment maintaining metallic band 46 in each half section 42 and 44 in spaced relationship from the outer surface of boom section 14 a distance of about five-sixteenths inch. This spacing was found to give optimum screening against extraneous ambient electrical currents. Closer spacing resulted in pickup of stray electrical currents from the boom, while wider spacing of members 46 from boom section 14 allowed ambient electrical currents to affect the ammeter readings. Similarly, viewing FIG. 2, the optimum distance between the left-hand margin of band 20 to the right-hand edge of each member 46 should be about 2¼ inches for the same reasons explained with respect to the spacing between members 46 and boom section 14, where band 30 has a nominal width of three-fourths inch and each member 46 is 3 inches wide.

The apparatus is set up for field testing of the current leakage through the insulative section 14 by first positioning aerial device 12 with its outer end disposed on the ground directly below the overhead line 24. The vehicle body is solidly grounded through an electrical grounding cable 62, and the microammeter 38 is securely grounded to the vehicle body and interconnected with the conductive bands 28 and 30. It will be noted that guard conductor 46 is grounded through conductor 56, boot 16 and the vehicle body. A conductive member such as a heavy copper cable 64 is bolted to the conductive bucket mounting bracket 66, and the aerial boom is then lifted until contacting rod 64 is brought into engagement with the overhead poawer line 24. Measurement of boom leakage current in controlled laboratory conditions is accomplished in a similar manner with the exception that the upper end of the insulative section of boom 14 is energized directly by a high voltage source, 100 KV or greater. The microammeter 38 is then monitored to determine the leakage currents passing through the insulative section 14 along the outer surface thereof and through its internal space 26.

The boom leakage currents are primarily capacitive in nature and are schematically depicted in FIG. 2 by C1 and C2 which respectively represent the leakage current through the internal space 26 of the boom and along the outer surface 34 of boom section 14. It is important that leakage current along outer surface 34 be monitored as such may change drastically with time due to the affects of weathering, contamination, moisture or insulation damage. Most commonly, for instance, contamination on the outer surface 34 will collect moisture that may form a film capable of conducting high current flow across insulative section 14. The ground means 40, while surrounding conductive band 30 in overlying relationship, does not interfere with the collection of leakage currents along outer surface 34 by band 30 in view of the positioning of guard conductor 46 in spaced, insulated relationship from boom surface 34. The leakage current along insulative section 14 is relatively small in magnitude however, on the order of approximately 100 microamperes or less, and yet such current must be measured with sufficient accuracy so as to reliably reflect small changes in the magnitude of the current leakage so that boom cleaning or other preventative measures may be taken prior to formation of dangerous conductive conditions along the boom.

Extraneous ambient electrical currents, illustrated schematically by C3 in FIG. 2, which emanate from the overhead power line 24 and other sources and pass directly through the air to the outer conductive band 30 are sufficiently large in magnitude so as to mask over the actual leakage currents C1, C2 of the boom and render the measurements of microammeter 38 relatively meaningless. The guard means 40, however, is positioned in shielding, overlying relationship to outer conductive band 30 so as to collect these extraneous ambient electrical currents C3 prior to their reaching conductive band 30. Guard conductor 46 is grounded through boot 16 so as to shunt these extraneous ambient electrical currents to ground so that the microammeter 38 detects substantially only the boom leakage currents C1 and C2.

While the actual size and shape of the guard conductor 46 and its position relative to conductive band 30 may vary depending upon the configuration of band 30 itself, optimal shielding of the conductive band 30 from the extraneous ambient electrical current C3 results by making the guard conductor 46 wider than conductive band 30 and positioning the guard conductor so as to extend past the opposed side margins 58 of band 30, along with locating the guard conductor above band 30 in spaced, surrounding relationship thereto. Such arrangement permits maximum shielding of the conductive band 30 from extraneous electrical currents C3 while leaving a conductive path along the outer surface 34 for the boom leakage current C2 to be collected by band 30. The outer protective layer of guard means 40 serves as an effective means for protecting said guard conductor from mechanical abrasion and damage by external objects such as tree limbs.

Multiple, concentric guard conductors may be incorporated within a guard means if necessary in order to further enhance the shielding of outer conductive band from the extraneous ambient currents. While in the preferred embodiment illustrated there is provided an insulative support strap 48 which directly engages the outer surface 34, the guard conductor 46 may be otherwise supported in insulated, spaced relationship to band 30 such as by directly securing guard conductor 46 to boot 16 in overlying but spaced disposition from band 30.

The guard conductor has also been found in practice to guard the inner pickup band 28 from ambient electrical currents. The proximal location of guard conductor 46 to band 28 collects and reduces the flow of ambient electrical currents that would otherwise reach band 28. In similar fashion the guard conductor protects other leakage current pickup elements which may be associated with the measuring circuitry, and in general increases the integrity of the entire measurement system in indicating the insulative condition of the boom.

Having thus described the invention, what is claimed as new and desired to be secured by Letters Patent is:

1. Apparatus for monitoring current leakage through the electrically insulative section of a boom of an aerial device, comprising:
    a conductive band disposed transversely around the outside surface of an insulative section of said boom for collecting leakage current passing through said section;
    detecting means electrically connected with said band for measuring said boom leakage current;
    at least one guard conductor disposed in spaced, surrounding, covering relationship to said band, said guard conductor being wider than said conductive band and extending beyond the opposed side marginal edges thereof;
    an insulative support carried by the boom in supporting relationship to said guard conductor to maintain the latter electrically insulated from said band, said support including a layer of synthetic resinous material disposed between the guard conductor and the band and at least partially incapsulating the guard conductor to protect the latter from mechanical abrasion and damage by external objects; and
    ground means connected to said guard conductor for electrically grounding the latter whereby said detecting means measures substantially only said boom leakage current.

2. Apparatus as set forth in claim 1, wherein said boom is hollow, and further includes a second conductive band disposed transversely about the inside surface of said boom for collecting leakage current passing through said boom, said detecting means being electrically connected with said first and second bands respectively for measuring said boom leakage current.

3. Apparatus as set forth in claim 1, wherein said device is mounted on an electrically grounded vehicle body, said ground means electrically connecting said guard conductor with the vehicle body whereby to ground said guard means.

4. Apparatus as set forth in claim 1, wherein said support layer has a segment between the guard conductor and boom of sufficient thickness to maintain the distance therebetween at about five-sixteenths inch.

5. Apparatus as set forth in claim 1, wherein said support layer has a groove on the inner surface thereof which is configured and arranged such that the layer does not contact said band.

6. Apparatus as set forth in claim 1, wherein said guard conductor partially incapsulated by synthetic resinous material is divided into two U-shaped sections, there being means for releasably, mechanically and electrically interconnecting the conductors of said two sections and for securing the latter on the outside surface of said boom.

7. Guard apparatus for a conductive band disposed transversely around the outside surface of the insulative section of a boom of an aerial device to collect leakage current passing through said section, said apparatus including:
    a guard conductor disposed externally of said band in surrounding, covering, electrically insulated relation-ship thereto, said guard conductor being wider than said band and extending past the opposed side marginal edges thereof and being operable to collect extraneous ambient electrical currents not passing through said boom to prevent the same from reaching said band;
    an insulative support carried by the boom in supporting relationship to said guard conductor to maintain the latter electrically insulated from said band, said support including a layer of synthetic resinous material disposed between the guard conductor and the band and at least partially incapsulating the guard conductor to protect the latter from mechanical abrasion and damage by external objects; and
    ground means connected to said guard conductor for electrically grounding the latter whereby said detecting means measures substantially only said boom leakage current.

* * * * *